United States Patent
Somes

(10) Patent No.: US 9,160,770 B2
(45) Date of Patent: Oct. 13, 2015

(54) TAGGING VOIP ORIGINATED TRAFFIC

(71) Applicant: Verizon Patent and Licensing Inc., Basking Ridge, NJ (US)

(72) Inventor: Brian Edmund Somes, Garland, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/053,010

(22) Filed: Oct. 14, 2013

(65) Prior Publication Data

US 2014/0036906 A1 Feb. 6, 2014

Related U.S. Application Data

(63) Continuation of application No. 13/093,461, filed on Apr. 25, 2011, now Pat. No. 8,559,309.

(51) Int. Cl.
*H04L 29/06* (2006.01)
*H04L 12/14* (2006.01)
*H04M 15/00* (2006.01)
*H04L 12/741* (2013.01)

(52) U.S. Cl.
CPC ........ *H04L 65/1009* (2013.01); *H04L 12/1425* (2013.01); *H04L 45/74* (2013.01); *H04L 65/1006* (2013.01); *H04L 65/1069* (2013.01); *H04L 65/607* (2013.01); *H04L 65/608* (2013.01); *H04M 15/43* (2013.01); *H04M 15/56* (2013.01); *H04M 15/62* (2013.01); *H04M 15/63* (2013.01); *H04M 15/8083* (2013.01)

(58) Field of Classification Search
CPC ..... H04L 47/10; H04L 49/351; H04L 47/125; H04L 12/18; H04L 12/42
See application file for complete search history.

(56) References Cited

U.S. PATENT DOCUMENTS

2005/0094623 A1* 5/2005 D'Eletto ........................ 370/352
2006/0251054 A1* 11/2006 Peters et al. ................... 370/352
2010/0260171 A1* 10/2010 Jeong et al. ................... 370/352

* cited by examiner

*Primary Examiner* — Jung Park

(57) ABSTRACT

A network node receives a Session Initiation Protocol (SIP) or H.323 signaling packet associated with data traffic, and determines if the data traffic originated from a source node or source network as Voice over Internet Protocol (VoIP) traffic. The network node tags a header of the SIP or H.323 signaling packet with a tag that identifies the data traffic as a VoIP originated call based on the determination, and sends the tagged SIP or H.323 signaling packet towards a destination. The network node further sends data identifying the data traffic as a VoIP originated call to an administrative system for at least one of call billing, rating, settlement or taxation purposes.

25 Claims, 9 Drawing Sheets

US 9,160,770 B2

TAGGING VOIP ORIGINATED TRAFFIC

RELATED APPLICATION

The present application is a continuation of U.S. Pat. No. 8,559,309 (filed as U.S. application Ser. No. 13/093,461), entitled "Tagging VoIP Originated Traffic" and filed Apr. 25, 2011, the disclosure of which is hereby incorporated by reference herein in its entirety.

BACKGROUND

A recent trend for reducing service costs in telecommunications networks involves the use of Voice over Internet Protocol (VoIP) for carrying calls between source and destination phones. IP networks typically incur minimal costs to carry data from sources to destinations, as opposed to Public Switched Telephone Networks (PSTNs) which typically incur much higher costs to carry phone calls from sources to destinations. By using VoIP (e.g., IP packets carrying audio data) for carrying a call for most of the distance of the call, instead of using a PSTN, the cost of the call can be reduced relative to having a PSTN carry the entirety of the call. Usually, VoIP involves a call being carried via the Internet to a point in the PSTN very close to the call destination. At that point, the call is switched to the PSTN for completion of the connection with the call destination. By minimizing the distance that the call is carried on the PSTN, the cost of the call may be substantially reduced relative to solely using the PSTN for the entirety of the call.

DETAILED DESCRIPTION OF THE PREFERRED EMBODIMENTS

Figure 1:
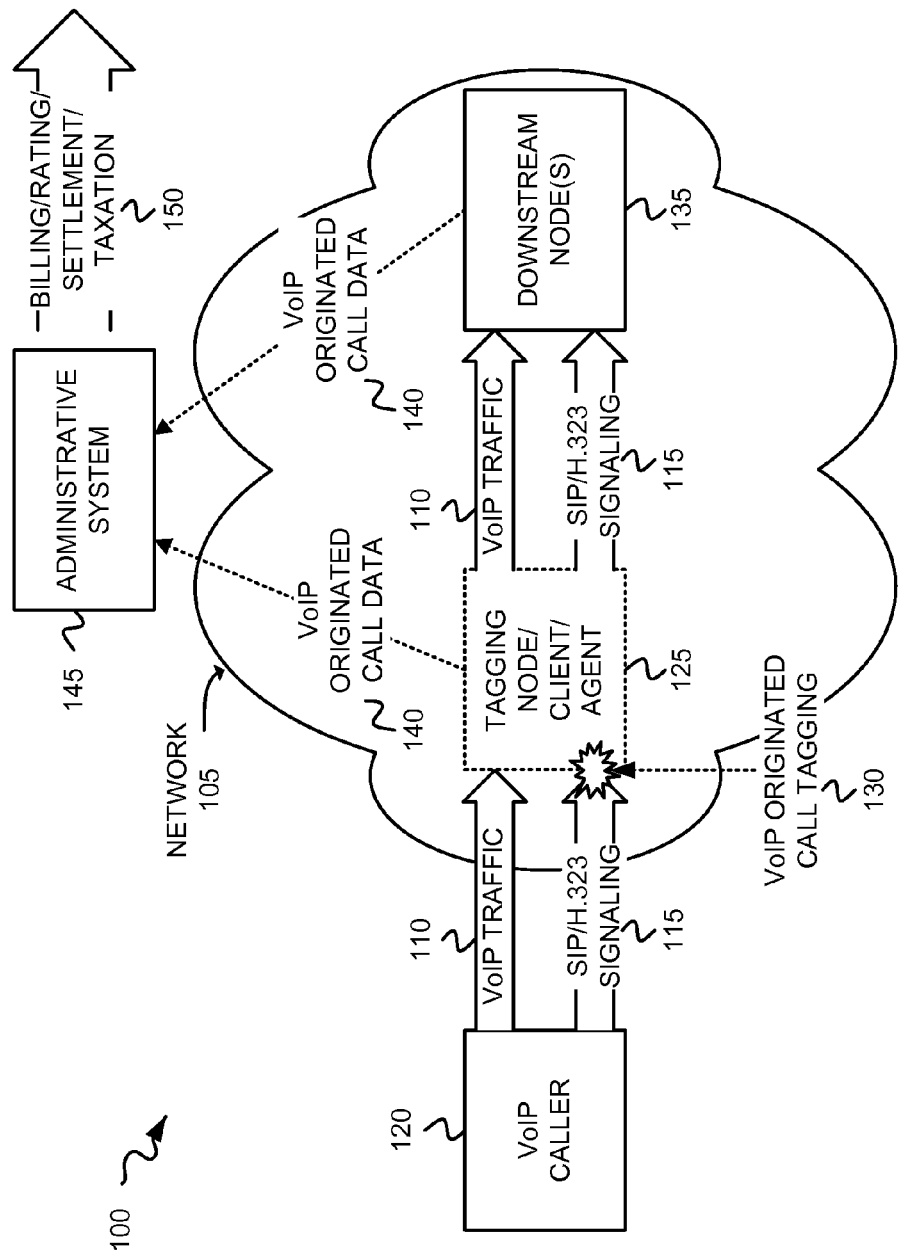
FIG. 1 is a diagram that depicts an exemplary network environment in which data traffic may be tagged to explicitly indicate that the data traffic originated in a VoIP network, or originated as a VoIP special service.

The following detailed description refers to the accompanying drawings. The same reference numbers in different drawings may identify the same or similar elements. The following detailed description does not limit the invention.

The Internet Engineering Task Force (IETF) has introduced a mechanism, described in Request for Comments (RFC) 4694, that enables the passing of the Time Division Multiplexed (TDM) originating jurisdiction associated with data traffic. This information is commonly used in TDM networks today for determining intra- vs. inter-state calls and applying proper settlement and taxation rules based on where the call actually originated. For example, this can be important for roaming mobile traffic where the calling party number of a roaming subscriber does not indicate where the call actually originated, which could be a completely different state or region. The mechanism introduced in RFC 4694 permits the TDM originating jurisdiction to be provided in signaling associated with the call that identifies the actual area from which the roaming mobile device originated the call.

The IETF defined mechanism used for passing the TDM originating jurisdiction is the routing number "rn" tag, having an optional "rn-context" tag, that may be placed in the signaling packet header used to identify the calling (originating) party. The "rn" tag is typically placed in the Session Initiation Protocol (SIP) "P-asserted-ID" or "Remote-party-ID" header in trusted carrier networks, although it may also appear in the originator's SIP "from" header.

Exemplary embodiments described herein enhance the originating jurisdiction information currently defined in RFC 4694 by including additional information in the "rn-context" or "rn" tag of the signaling packet header that enables data traffic that originated from a source node or a source network as VoIP traffic to be distinguished from data traffic that did not originate as VoIP traffic, or which cannot be verified as having originated as VoIP traffic. This additional information provided in the header of signaling traffic (e.g., SIP or H.323 signaling traffic) enables data traffic that originated as VoIP traffic to be identified and processed differently from other VoIP traffic that is either unverifiable as VoIP originated traffic or that is TDM originated traffic that has been converted into VoIP (e.g., via a gateway) and, therefore, is not truly VoIP originated traffic.

By being able to identify data traffic as originating from a source node or source network as VoIP traffic, the data traffic may be subject to reduced settlement and taxation burdens as compared with the existing settlement and taxation structure applied to typical TDM (i.e., non-VoIP originated) network traffic. Additionally, by being able to identify data traffic as originating from a source node or source network as VoIP traffic, the identified traffic may be routed, by certain nodes/switches within the network, to, for example, other VoIP-based Long Distance (LD) carriers and/or Competitive Local Exchange Carriers (CLEC) that support reduced VoIP rates.

FIG. 1 is a diagram that depicts an exemplary network environment 100 in which data traffic may be tagged to explicitly indicate that the data traffic originated from an original source node or network as VoIP traffic. Data traffic transiting a network may include Time Division Multiplexed (TDM) traffic that has been converted into VoIP traffic (e.g., by a gateway) or VoIP traffic that is not positively identifiable as originating as true VoIP traffic. The data traffic may be associated with a call from/to a caller, and the data traffic may be tagged, as described herein, to indicate that the data traffic includes a VoIP originated call. Tagging of the data traffic permits billing, rating, settlement and/or taxation to be applied to the data traffic based on knowledge that the data traffic originated from an original source node or network as VoIP traffic. A "VoIP originated call" or "VoIP originated traffic," as referred to herein, includes data traffic that originated from an original source node or network as VoIP traffic. "VoIP originated call" or "VoIP originated traffic," therefore, would not include VoIP traffic that was converted to VoIP from another format (e.g., TDM) after being sent from the original source node or network to a destination node.

As shown in FIG. 1, network environment 100 may include a network 105 that may carry VoIP traffic 110 and SIP/H.323 signaling traffic 115 associated with a VoIP call to/from a VoIP caller 120 to/from another node (not shown). VoIP traffic 110 may include VoIP media traffic, such as, for example, Real-time Transport Protocol (RTP) or RTP Control Protocol (RTCP) traffic. VoIP traffic 110 may originate from a VoIP special service, such as an IP Multimedia Subsystem (IMS) service, etc.

SIP/H.323 signaling traffic 115 may include SIP signaling traffic or H.323 signaling traffic.

A tagging node/client/agent 125 may tag packets of the SIP/H.323 signaling traffic 115 of the VoIP call to indicate that the call is a VoIP originated call. Tagging node/client/agent 125 may include, for example, a SIP user agent that is resident at VoIP caller 120, a client application that is resident at VoIP caller 120, or a node located at various places in network 105 that handles VoIP traffic 110 and/or SIP/H.323 signaling traffic 115. In some instances, tagging node 125 may include a border-type gateway or a Session Border Controller (SBC) that interconnects two networks, or a VoIP call server that handles VoIP calls between VoIP callers. Tagging node/client/agent 125 may determine whether VoIP traffic 110 originated from an original source node or networks as VoIP traffic, and may then tag headers of packets of corresponding SIP/H.323 signaling traffic 115 based on whether VoIP traffic 110 is VoIP originated traffic. This tagging is referred to herein as "VoIP originated call tagging" 130. Tagging the header of packets of SIP/H.323 signaling traffic 115 may include inserting data into a field of the header that indicates that VoIP traffic 110 originated from an original source node or network as VoIP traffic. The tagging of the headers of packets by tagging node/client/agent 125 will be described in further detail below. Subsequent to tagging, or not tagging, signaling traffic 115 associated with VoIP traffic 110, tagging node/client/agent 125 may forward SIP/H.323 signaling traffic 115 and/or VoIP traffic 110 onto one or more downstream nodes 135. The downstream nodes 135 may, in turn, forward SIP/H.323 signaling traffic 115 and/or VoIP traffic 110 to a destination node that may include, for example, another VoIP caller (not shown) engaging in a VoIP call with VoIP caller 120.

Before, during, or after the tagging of headers of SIP/H.323 signaling traffic 115, tagging node/client/agent 125 may generate VoIP originated call data 140 that indicates that corresponding VoIP traffic 110 originated from a source node as VoIP traffic. Tagging node/client/agent 125 may send VoIP originated call data 140 to an administrative system 145. Administrative system 145 may use VoIP originated call data 140 for billing, rating, settlement, and/or taxation 150 purposes.

As further shown in FIG. 1, one or more downstream nodes 135 may also generate VoIP originated call data 140 that indicates that corresponding VoIP traffic 110 originated from an original source node or network as VoIP traffic. Downstream node(s) 135 may also send VoIP originated call data 140 to administrative system 145 for use in billing, rating, settlement, and/or taxation 150.

Figure 2A:
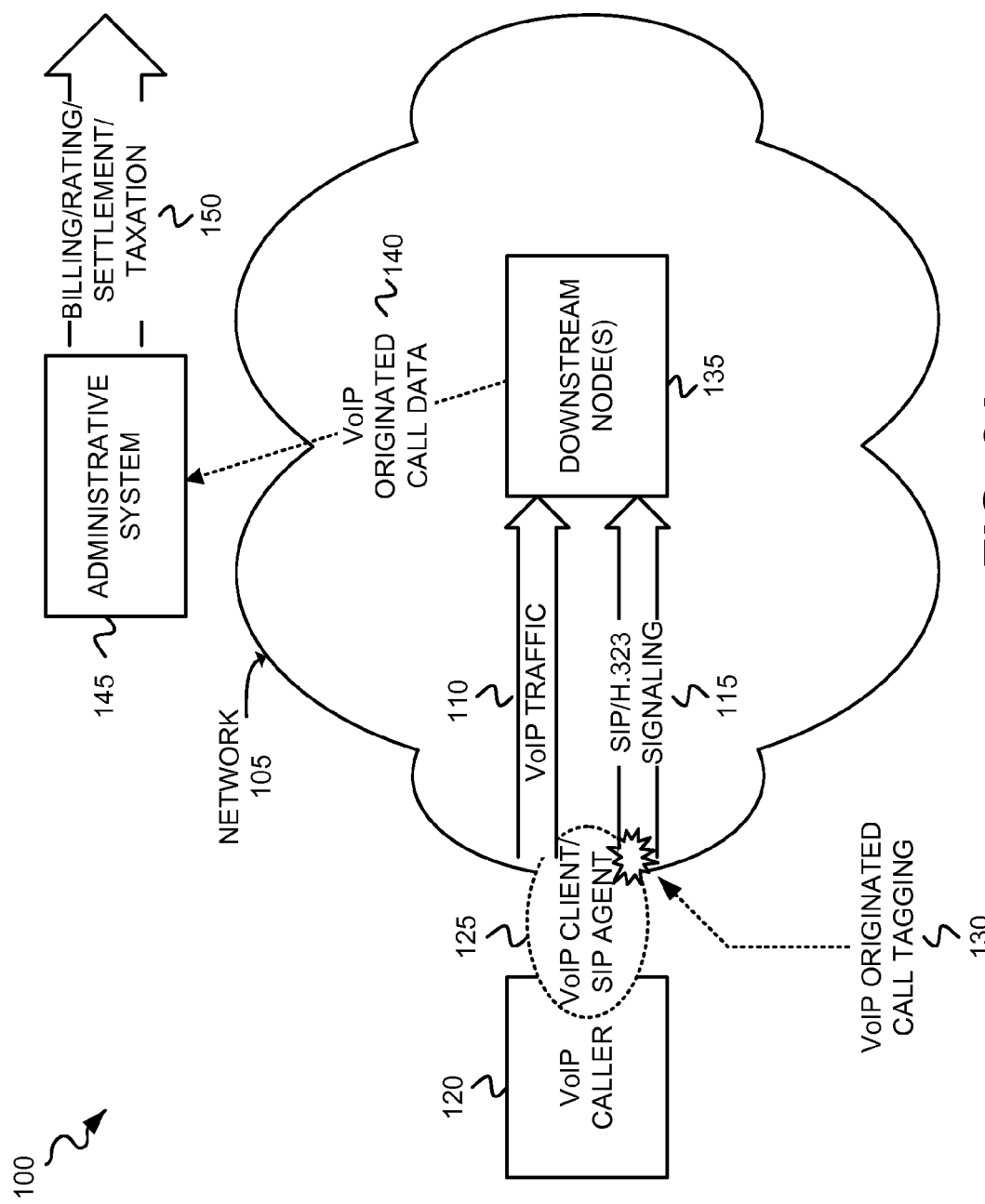
FIGS. 2A-2C illustrate specific examples of different locations where the tagging of data traffic may occur to identify whether the data traffic originated in a VoIP network, or originated as a VoIP special service.
Figure 2B:
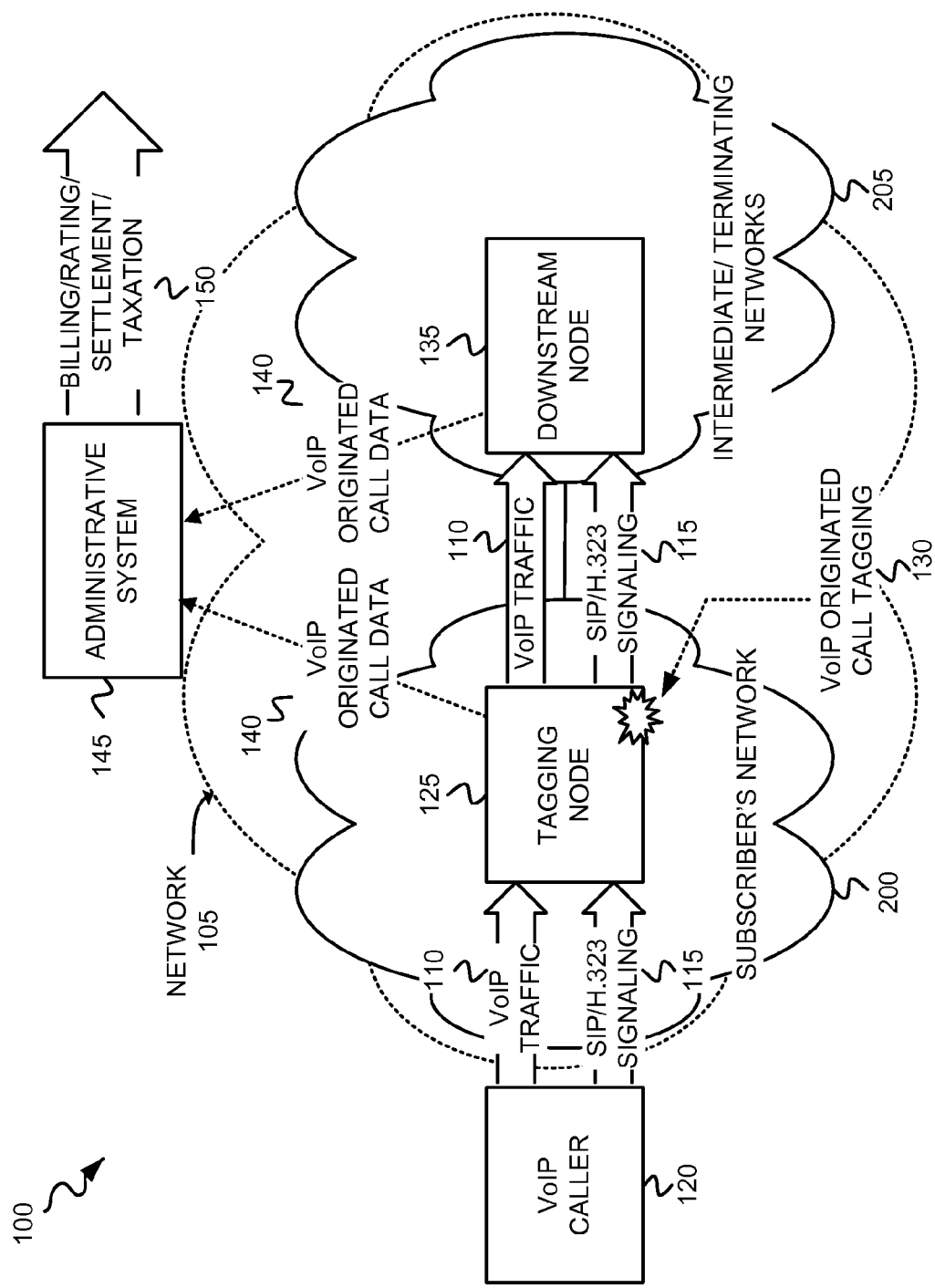
Figure 2C:
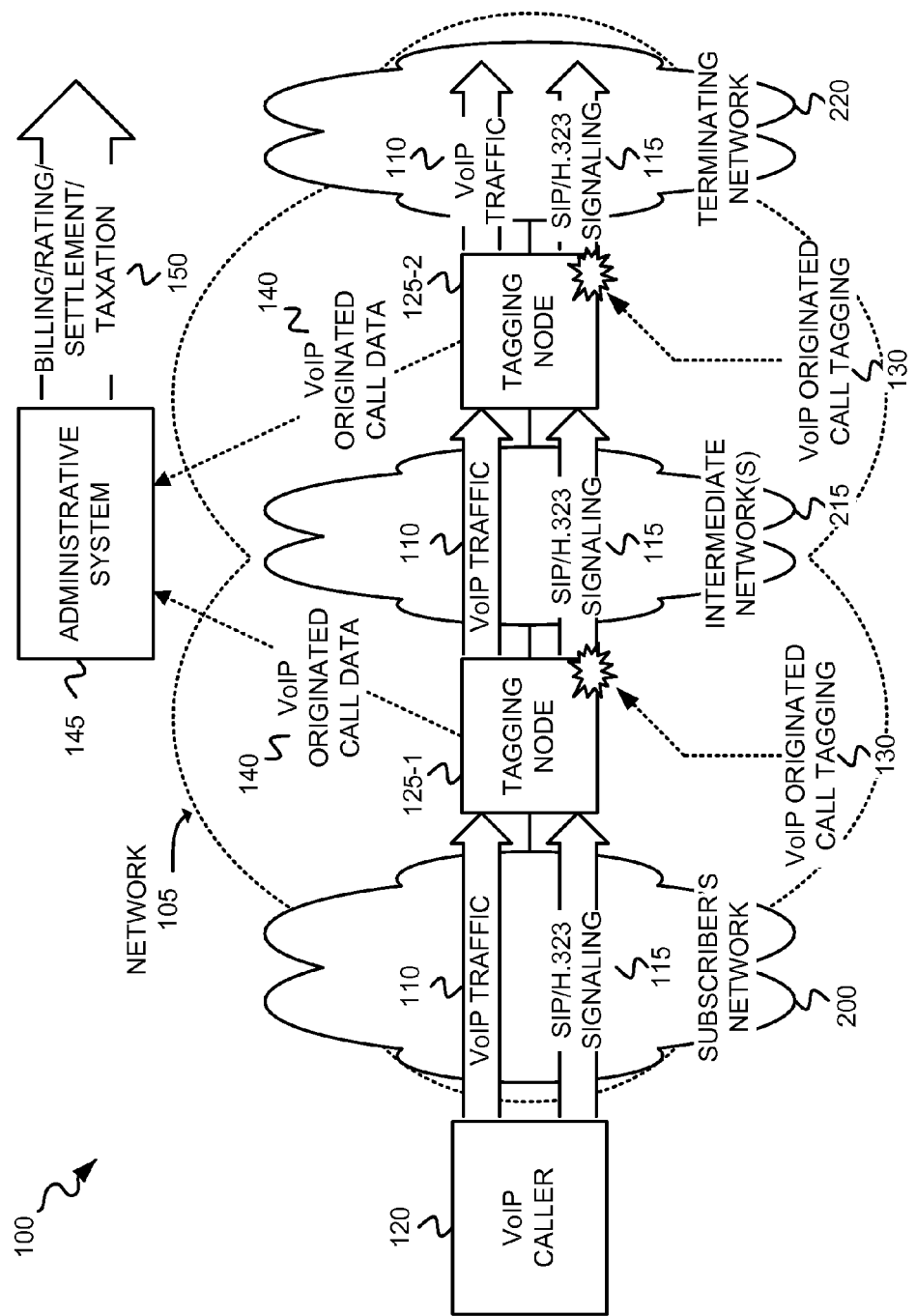

FIGS. 2A-2C illustrate specific examples of different locations where the tagging of traffic may occur to identify whether the traffic originated from an original source node or network as VoIP traffic. FIG. 2A depicts an example where tagging node/client/agent 125 is a VoIP client or SIP agent that resides at VoIP caller 120. In this example, VoIP client/SIP agent 125 may perform VoIP originated call tagging 130 on outgoing traffic prior to the traffic being sent over network 105. As further shown in FIG. 2A, downstream node(s) 135, upon receiving VoIP traffic 110 or SIP/H.323 signaling traffic 115, may generate VoIP originated call data 140, that indicates that VoIP traffic 110 is associated with a VoIP originated call, and may send data 140 to administrative system 145 for use in billing, rating, settlement, and/or taxation 150.

FIG. 2B depicts another example in which tagging of the traffic occurs at a tagging node within the subscriber's network (i.e., the network that "owns" and can verify/authenticate the identity of the subscriber associated with VoIP caller 120). As shown in FIG. 2B, network 105 may include a subscriber's network 200, where traffic 110 and 115 may originate, and one or more intermediate/terminating networks 205, where traffic 110 and 115 may be handled prior to reaching a destination endpoint (not shown). As shown in FIG. 2B, VoIP caller 120 may send VoIP traffic 110 and SIP/H.323 signaling traffic 115 via subscriber's network 200. Tagging node 125, upon receiving SIP/H.323 signaling traffic 115, may use its knowledge of the subscriber associated with VoIP caller 120 to identify that VoIP traffic 120 originates from an original source node or network as VoIP traffic. Tagging node 125 may insert a tag into the headers of SIP/H.323 signaling traffic 115 to indicate that the corresponding VoIP traffic 110 is associated with a VoIP originated call. Tagging node 125 may forward traffic 110 and 115 on to downstream nodes 135 in intermediate or terminating networks 205 in network 105. At tagging node 125 and/or downstream nodes 135, VoIP originated call data 140 may be generated that identifies traffic 110 as VoIP originated traffic, and data 140 may be sent to administrative system 145 for billing, rating, settlement, and/or taxation 150 purposes.

FIG. 2C depicts a further example in which tagging of the traffic occurs at a tagging node downstream of the subscriber's network (i.e., the network that "owns" and can verify/authenticate the identity of the subscriber associated with VoIP caller 120). The tagging may occur at one or more intermediate networks and/or a terminating network downstream of the subscriber's network, or between the subscriber's network and an intermediate network, or between two intermediate networks, or between an intermediate network and a terminating network. As shown in FIG. 2C, network 105 may include subscriber's network 200, where traffic 110 and 115 may originate; one or more intermediate networks 215, where traffic 110 and 115 may be handled prior to reaching a terminating network 220; and terminating network 220, where traffic 110 and 115 may be handled prior to reaching a destination endpoint (not shown).

As shown in FIG. 2C, VoIP caller 120 may send VoIP traffic 110 and SIP/H.323 signaling traffic 115 via subscriber's network 200. In one implementation, tagging node 125-1, upon receiving SIP/H.323 signaling traffic 115, may determine that VoIP traffic 120 originates from an original source node or network as VoIP traffic. Tagging node 125-1 may insert a tag into the headers of SIP/H.323 signaling traffic 115 to indicate that the corresponding VoIP traffic 110 is associated with a VoIP originated call. Tagging node 125-1 may forward traffic 110 and 115 on to intermediate network(s) 215. Tagging node 125-1 may reside within intermediate network(s) 215, or between subscriber's network 200 and intermediate network 215 (e.g., a border-type gateway, or a SBC). When resident in intermediate network 215, tagging node 125-1 may know, by agreement with network 200, that all traffic received over a specific connection with network 200 is VoIP originated. Network 200, in accordance with the agreement, may identify and route only VoIP originated traffic over the specific connection. Therefore, tagging node 125-1, residing within network 215, may tag traffic received over the specific connection as VoIP originated even if network 200 does not specifically provide VoIP originated tagging in signaling to network 215.

As further shown in FIG. 2C, another tagging node 125-2 may, upon receiving SIP/H.323 signaling traffic 115, determine that VoIP traffic 120 originates from an original source node or network as VoIP traffic. Tagging node 125-2 may insert a tag into the headers of SIP/H.323 signaling traffic 115 to indicate that the corresponding VoIP traffic 110 is associated with a VoIP originated call. Tagging node 125-2 may forward traffic 110 and 115 on to terminating network 220. Tagging node 125-2 may reside within intermediate network(s) 215 or terminating network 220, or may reside between intermediate network(s) 215 and terminating network 220 (e.g., a border-type gateway, or a SBC). When resident in terminating network 220, tagging node 125-2 may know, by agreement with network 215, that all traffic received over a specific connection with network 215 is VoIP originated. Network 215, in accordance with the agreement, may identify and route only VoIP originated traffic over the specific connection. Therefore, tagging node 125-2, residing within terminating network 220, may tag traffic received over the specific connection as VoIP originated even if network 215 does not specifically provide VoIP originated tagging in signaling to network 220.

Either of tagging nodes 125-1 or 125-2 may generate and send VoIP originated call data 140 to administrative system 145 to information system 145 that VoIP traffic 110 originated from an original source node or network as VoIP traffic. Administrative system 145 may use data 140 for billing, rating, settlement and/or taxation 150 purposes.

Figure 3:
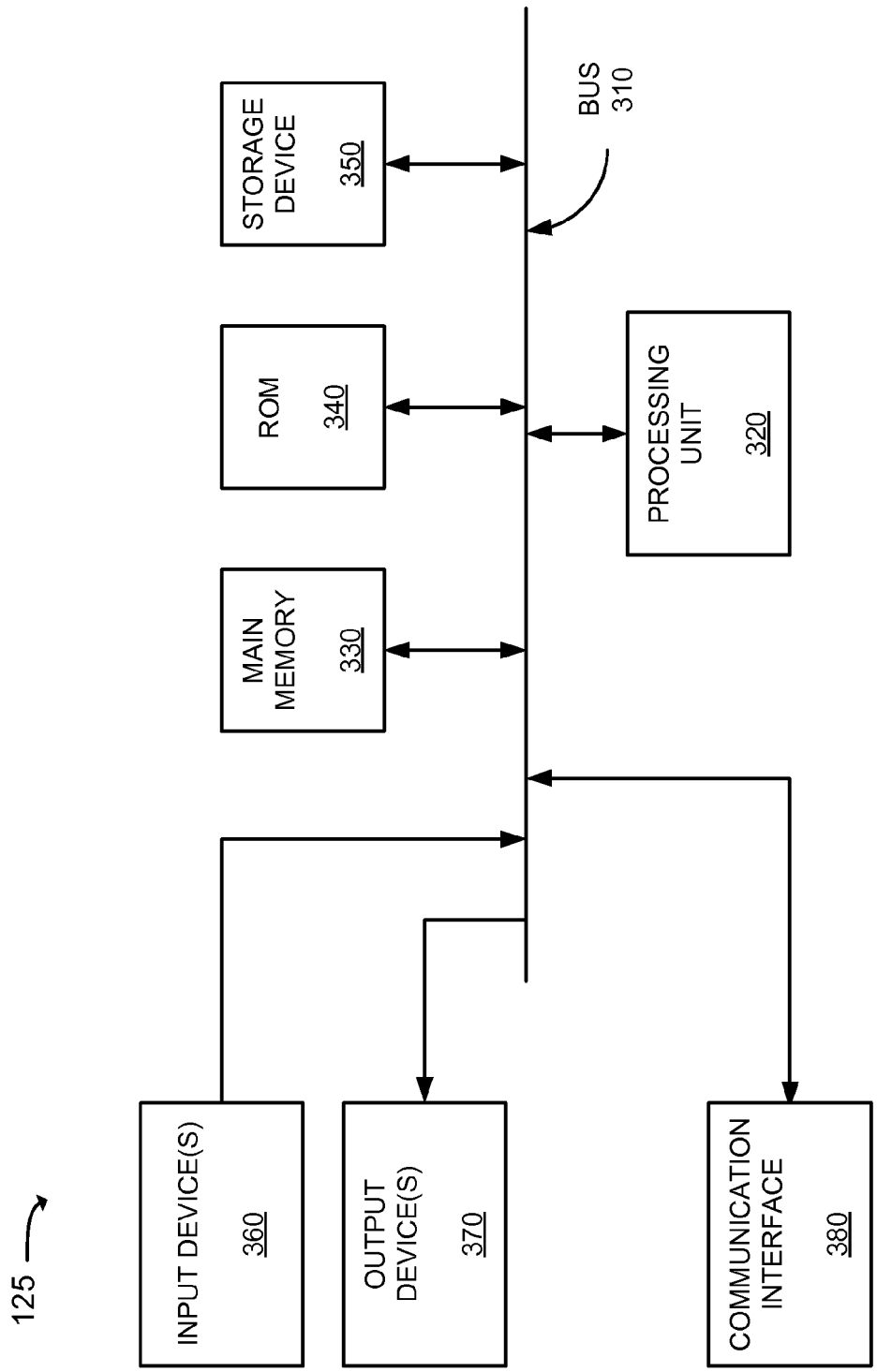
FIG. 3 is a diagram that depicts exemplary components of the tagging node of FIG. 1.

FIG. 3 is a diagram that depicts exemplary components of tagging node 125. VoIP caller 120, administrative system 145, and downstream node(s) 135 may be similarly configured. Tagging node 125 may include a bus 310, a processing unit 320, a main memory 330, a read only memory (ROM) 340, a storage device 350, an input device(s) 360, an output device(s) 370, and a communication interface 380. Bus 310 may include a path that permits communication among the elements of tagging node 125.

Processing unit 320 may include a processor, microprocessor, or processing logic that may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium.

Input device 360 may include one or more mechanisms that permit an operator to input information to tagging node 125, such as, for example, a keypad or a keyboard, voice recognition and/or biometric mechanisms, etc. Output device 370 may include one or more mechanisms that output information to the operator, including a display, a speaker, etc. Communication interface 380 may include any transceiver mechanism that enables tagging node 125 to communicate with other devices and/or systems. For example, communication interface 380 may communicate with other nodes in network 105.

The configuration of components of tagging node 125 illustrated in FIG. 3 is for illustrative purposes only. Other configurations may be implemented. Therefore, tagging node 125 may include additional, fewer and/or different components than those depicted in FIG. 3.

Figure 4:
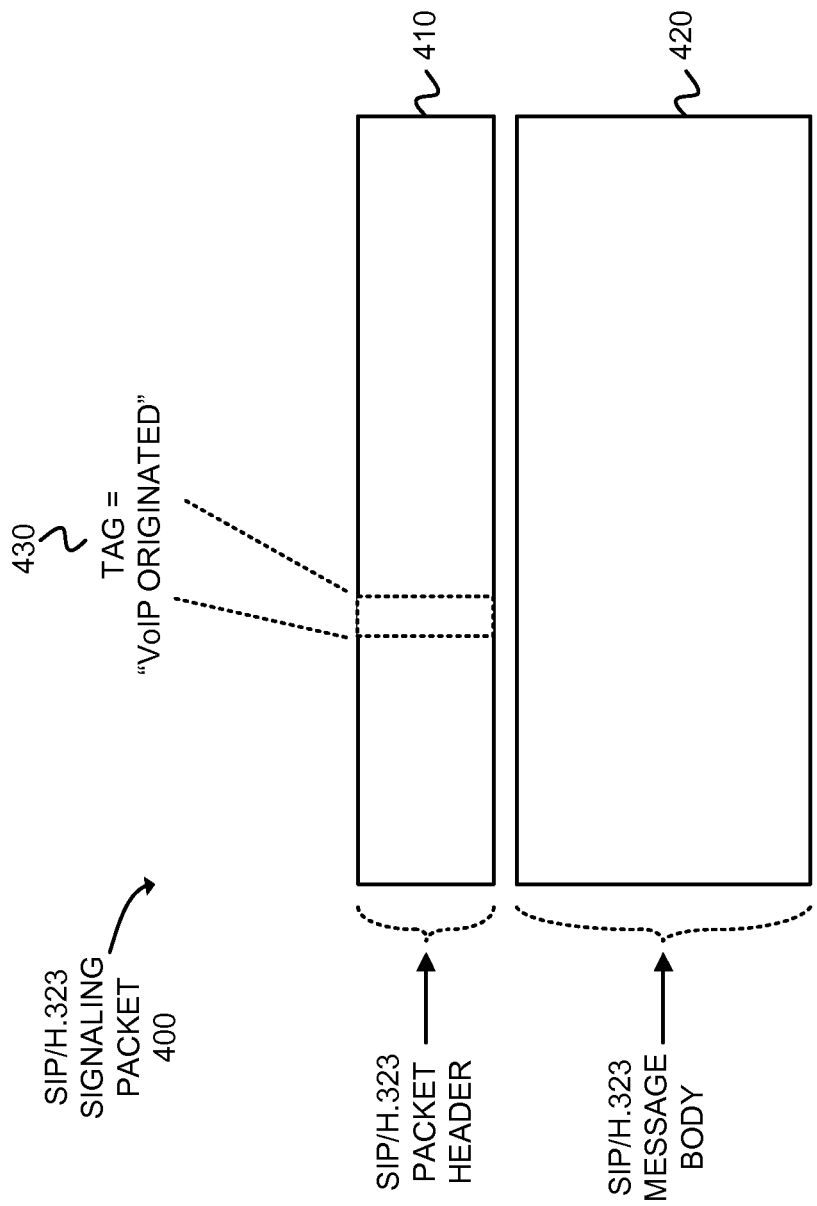
FIG. 4 illustrates exemplary components of a SIP/H.323 signaling packet from the SIP/H.323 signaling traffic of FIG. 1 that may be tagged to indicate that the corresponding data traffic originated in a VoIP network, or originated as a VoIP special service.

FIG. 4 illustrates exemplary components of a SIP/H.323 signaling packet 400 of SIP/H.323 signaling traffic 115, shown in FIG. 1. Packet 400 may include a SIP/H.323 packet header 410, an optional SIP/H.323 message body 420, and a "VoIP originated" tag 430. SIP/H.323 signaling packet 400 may be used for controlling multimedia communication sessions, such as voice and video calls over IP.

Header 410 may include data that identifies a type of packet 400 (e.g., invite, ACK, bye, etc.), and may include other data depending on the identified type of packet 400. The other data may include, for example, data that identifies the SIP version associated with packet 400, particular status codes, a requested Uniform Resource Identifier (URI), etc. Header 410 may additionally include "VoIP originated" tag 430 inserted into a field of header 410. Optional message body 420 may include various data used in SIP or H.323. Detail of the data that may be included in message body 420 is not further described herein.

"VoIP originated" tag 430 may include data that identifies whether data traffic associated with SIP/H.323 signaling packet 400 originated from an original source node or network as VoIP traffic. In one exemplary implementation, the "rn-context" parameter, defined in RFC 4694, may be modified to indicate that the data traffic is associated with a VoIP originated call. For example, the "rn-context" parameter could be set to a specific numeric or textual value ("rn-context"=9999 or "rn-context"="VoIP originated") to indicate that the data traffic is associated with a VoIP originated call, or the "rn-context" value could be set to another, different value (e.g., "rn-context"=0000 or "rn-context"="non-VoIP originated") to indicate that the data traffic is not associated with a VoIP originated call. In other exemplary implementations, if signaling packet 400 does not include the "rn-context" tag, then, by default, it may be assumed that the data traffic is non-VoIP originated since the origination is not positively identifiable.

In yet another exemplary implementation, "VoIP originated" tag 430 may include additional information appended to the routing number tag "rn" instead of setting the "rn-context" tag to specific numeric or textual values. For example, a "V" or "9" could be appended to the "rn" tag such as rn=+1972530-V or rn=+1972530-9, where the value 1972530 is the actual jurisdiction, and the "V" or "9" appended to the end indicates that the data traffic is VoIP originated. As another example, the "rn" tag could be set equal to the following: rn=9725309999, where the value 972530 is the jurisdiction and the "9999" appended to the end indicates that the data traffic is VoIP originated.

In a further exemplary implementation, "VoIP originated" tag 430 may include values set in a "rn" tag that explicitly specify that the call was VoIP originated. Therefore, instead of setting values of the "rn-context" tag, or appending values to an existing jurisdiction number in the "rn" tag, a specific value for the jurisdiction number may be set in the "rn" tag that identifies that the call was VoIP originated. For example, "rn" tag could be set to the value +1800999, which is normally not a valid jurisdiction code, but would represent a VoIP originated jurisdiction. A specific jurisdiction code could be reserved to represent a VoIP origination or an existing jurisdiction code where all subscribers in the jurisdiction are now VoIP could be re-assigned to indicate that all data traffic originating from that jurisdiction is VoIP originated.

Figure 5:
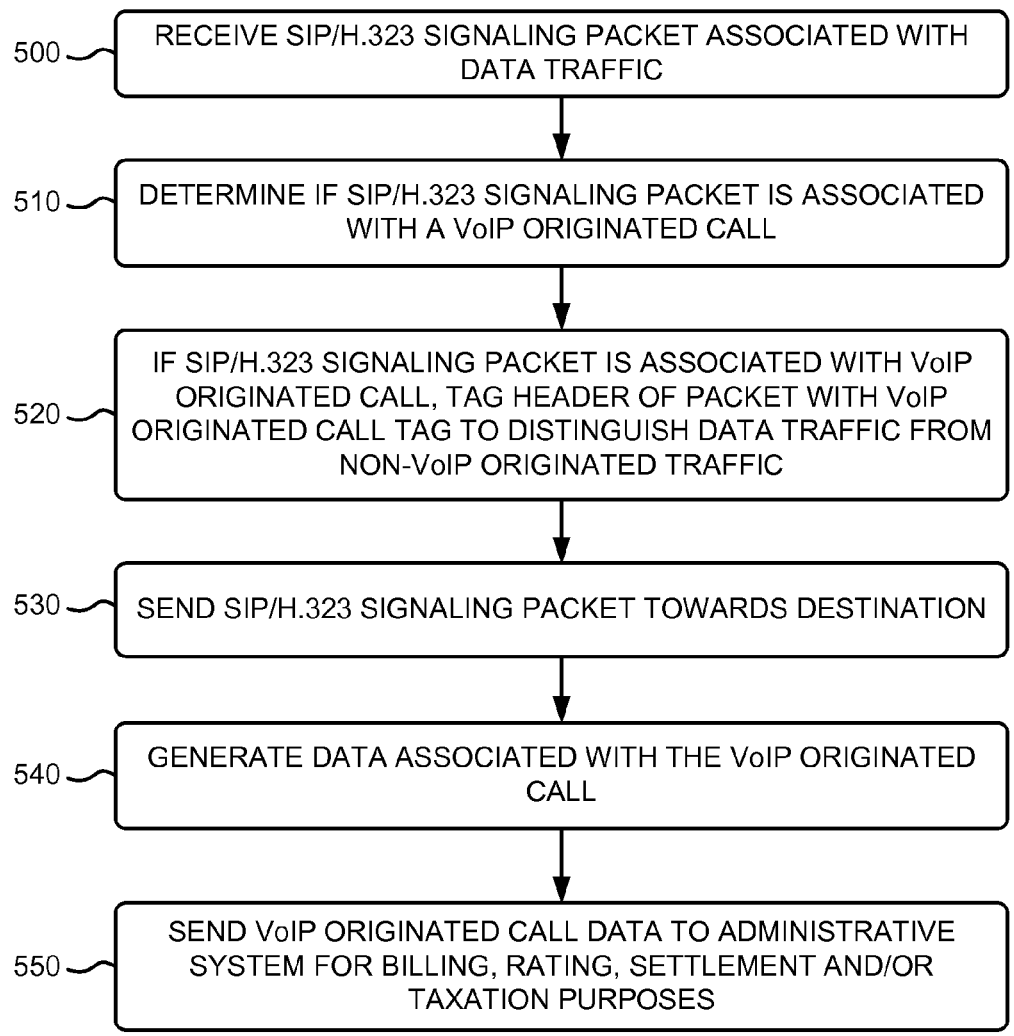
FIG. 5 is a flow diagram that illustrates an exemplary process for tagging SIP/H.323 signaling traffic associated with a VoIP originated call.

FIG. 5 is a flow diagram that illustrates an exemplary process for tagging SIP/H.323 signaling traffic associated with a VoIP originated call. The exemplary process of FIG. 5 may be implemented by tagging node/client/app 125. The exemplary process of FIG. 5 is described below with reference to the messaging diagram of FIG. 6.

Figure 6:
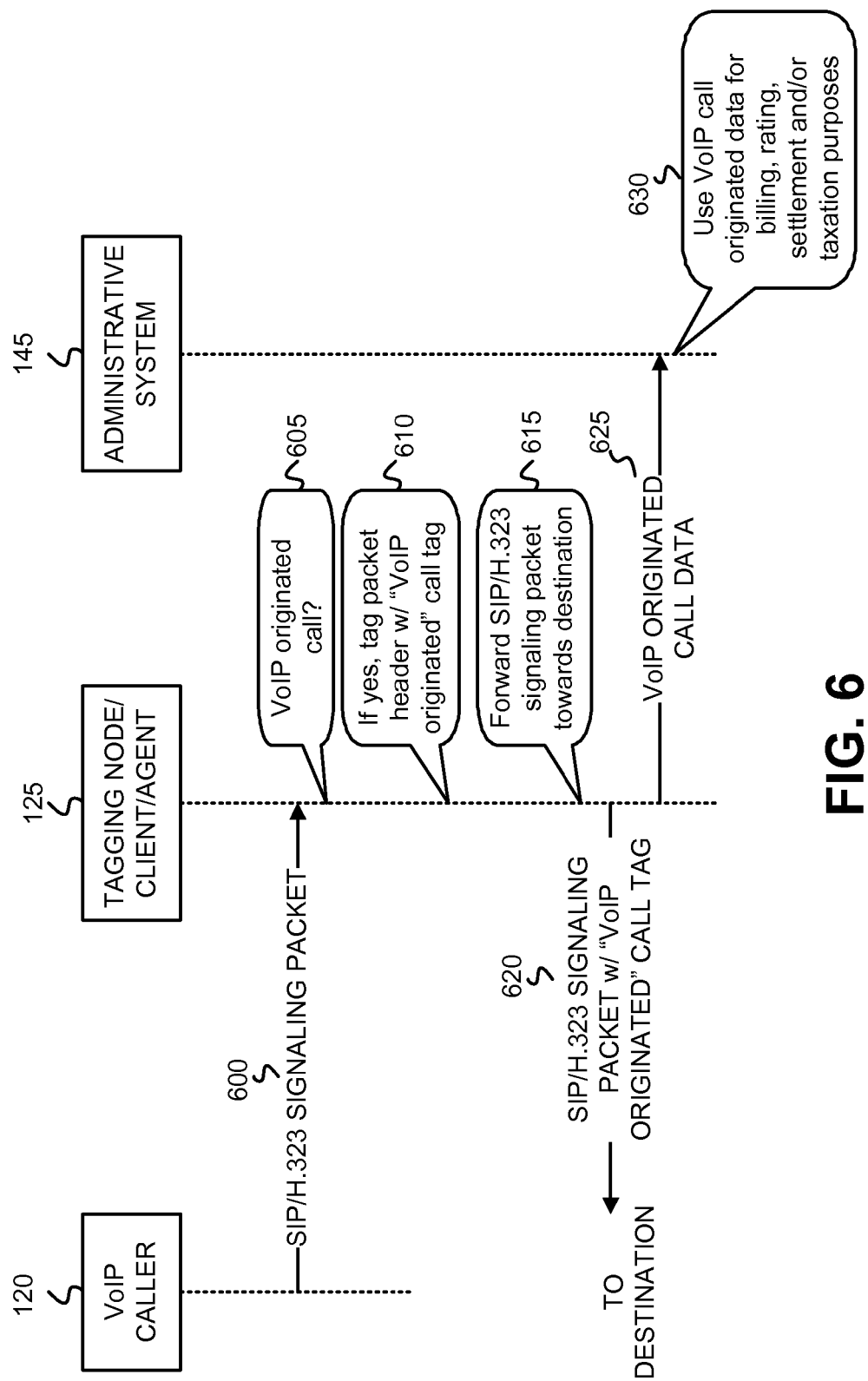
FIG. 6 is an exemplary messaging diagram associated with the process of FIG. 5.

The exemplary process may include receiving a SIP/H.323 signaling packet associated with data traffic (block 500). FIG. 6 depicts VoIP caller 120 sending a SIP/H.323 signaling packet 600 to tagging node/client/agent 125. Tagging node/client/application 125, upon receipt of packet 600, may determine if SIP/H.323 signaling packet 600 is associated with a VoIP originated call (block 510). In one instance, tagging node 125 may store information indicating that a call from a source from which packet 600 originated is by default a VoIP originated call. If, for example, the data traffic associated with packet 600 originated in the network of the subscriber, tagging node 125, which resides in the subscriber network (e.g., network 200), may have knowledge, based on, for example, information stored in memory 340, that a call from a particular source in the subscriber's network is a VoIP originated call. In another instance, tagging node 125 may store information indicating that the address (e.g., IP address) associated with the source of the packet is a VoIP traffic originator. In a further instance, tagging node 125 may store information indicating that all traffic received from a specific customer, carrier, or network, or from a specific connection, trunk, or network address, is either all non-VoIP originated, or all VoIP originated. The specific network may, for example guarantee that all traffic is VoIP originated, or that traffic from a specific IP address in that network is VoIP originated, etc.

In an additional instance, the original source node (e.g., SIP agent) or source network for the packet may have already inserted an identifier/tag in the packet identifying the packet as being associated with VoIP originated data traffic. In this case, tagging node 125 may determine that the data traffic is VoIP originated based on the identifier/tag inserted in the packet. In yet another instance, tagging node 125 may store information indicating that data traffic that originated from a particular subscriber may be considered to be VoIP originated traffic. In yet another instance, tagging node 125 may identify the packet as being associated with VoIP originated data traffic by, for example, looking up the associated subscriber in a database that indicates that it is a VoIP client.

In an instance where the signaling packet has no identifier/tag identifying the packet as being associated with VoIP originated data traffic, and there is no other information or agreements that traffic coming from a specific carrier, customer, or network, or over a specific connection, trunk, or network address is VoIP originated, then the data traffic would not be positively identifiable as being VoIP originated and, by default, may be treated as non-VoIP originated data traffic. As shown in FIG. 6, tagging node/client/agent 125 may determine 605 whether the call is a VoIP originated call.

If the SIP/H.323 signaling packet is associated with a VoIP originated call, tagging node/client/app 125 may tag a header of the packet with a VoIP originated call tag to distinguish the data traffic from non-VoIP originated traffic (block 520). Tagging node/client/agent 125 may tag header 410 of signaling packet 400 with VoIP originated call tag 430 that identifies that the call originated from an original source node or network as VoIP traffic. In the case of the signaling packet already having an identifier/tag in the packet identifying the packet as being associated with VoIP originated data traffic (e.g., supplied by an upstream tagging node, or by another upstream network), then tagging node/client/agent 125 may preserve the identifier/tag instead of supplying a new tag to the packet header. Referring to FIG. 6, tagging node/client/agent 125 is shown as tagging 610 the header of signaling packet 600 with the "VoIP originated" call tag. Tagging node/client/app 125 may send the SIP/H.323 signaling packet towards its destination (block 530). FIG. 6 depicts tagging node/client/agent 125 forwarding 615 signaling packet 620, tagged with the "VoIP originated" call tag, towards the packet destination.

Tagging node/client/app 125 may generate data associated with the VoIP originated call (block 540). The VoIP originated call data may identify the specific call associated with the signaling packet as having originated from an original source node or network as VoIP traffic. Tagging node/client/app 125 may send the VoIP originated call data generated in block 540 to administrative system 145 for billing, rating, settlement and/or taxation purposes (block 550). FIG. 6 depicts VoIP call originated data 625 being sent to administrative system 145, where administrative system 145 uses the VoIP call originated data for billing, rating, settlement and/or taxation purposes. Administrative system 145 may, for example, identify special rates or rules that apply to the traffic of the VoIP originated call. The regulatory environment with respect to telephone calls in some jurisdictions (e.g., the United States) is moving towards allowing VoIP originated calls to fall under reduced settlement and taxation burdens, as compared with the existing settlement and taxation regulatory structure for typical Time Division Multiplexed (TDM) (non-VoIP originated) network traffic.

Figure 7:
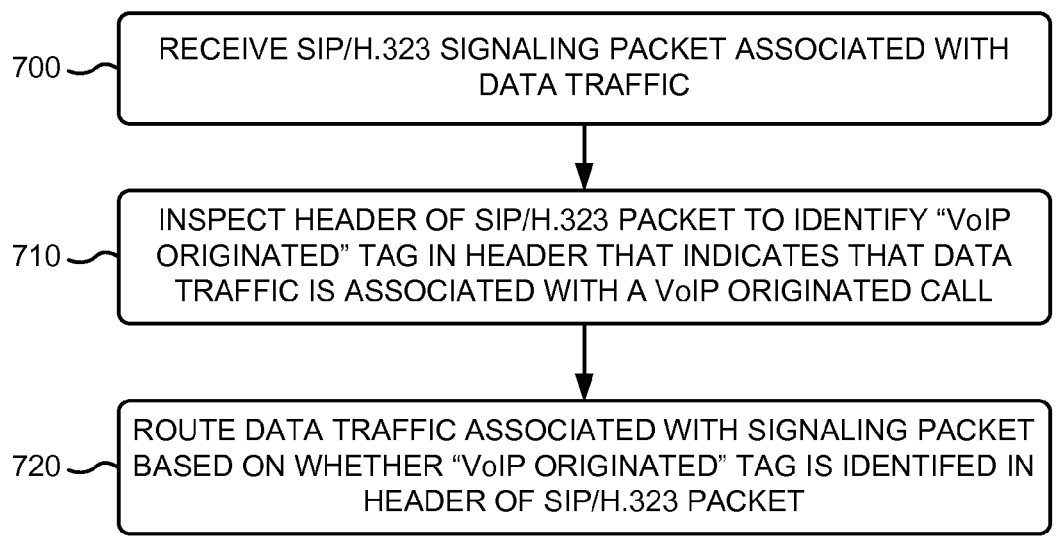
FIG. 7 is a flow diagram that illustrates an exemplary process for routing data traffic based on "VoIP originated" tags in signaling packets associated with the data traffic.

FIG. 7 is a flow diagram that illustrates an exemplary process for routing data traffic based on "VoIP originated" tags in signaling packets associated with the data traffic. The exemplary process of FIG. 7 may be implemented by tagging node 125 and/or downstream node 135.

The exemplary process may include receiving a SIP/H.323 signaling packet associated with data traffic (block 700). Referring to any of FIGS. 2A-2C, tagging node/client/agent 125 or downstream node(s) 135 may receive a signaling packet that is associated with data traffic being handled by tagging node/client/agent 125 or downstream node(s) 135. A header of the SIP/H.323 signaling packet may be inspected to identify whether a "VoIP originated" tag exists in the header that indicates that the corresponding data traffic is associated with a VoIP originated call (block 710). Tagging node/client/agent 125 or downstream node(s) 135 may inspect the header of the received SIP/H.323 signaling packet 430 to identify whether "VoIP originated" tag 430 is present in header 410.

Data traffic associated with the signaling packet may be routed based on whether a "VoIP originated" tag is identified in the header of the SIP/H.323 packet (block 720). For example, tagging node/client/agent 125 or downstream node 135 may route the data traffic, as a VoIP originated call, to other VoIP-based Long Distance (LD) carriers or Competitive Local Exchange Carriers (CLECs) supporting reduced "VoIP special services" rates and/or reduced taxation based on the identification of "VoIP originated" tag 430 in the header of signaling packet 430. In another example, tagging node/client/agent 125 or downstream node 135 may route only VoIP originated data traffic to a specific subsequent carrier/network, or over a specific connection or network address (e.g., Internet Protocol (IP) address) based on, for example, agreements with that subsequent carrier/network. Tagging node/client/agent 125 or downstream node 135 may, therefore, avoid terminating VoIP originated tagged data traffic to TDM networks if other subsequent VoIP networks/connections or VoIP terminating networks/connections exist that can handle the data traffic. As described herein, VoIP originated information may used to route data traffic, thereby affecting how the data traffic is terminated within network 105.

Exemplary implementations described herein enable the tagging of data traffic to identify that the data traffic originates from an original source node or network as VoIP traffic.

Tagging of the data traffic permits the data traffic to be routing differently than other traffic based on the tagging. Tagging of the data traffic additional permits billing, rating, settlement and/or taxation to be applied differently to the tagged data traffic thereby enabling, for example, reduced rates and/or taxation to be applied to the data traffic compared with other non-VoIP originated traffic.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5 and 7, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, at a network device, a Session Initiation Protocol (SIP) or H.323 signaling packet associated with data traffic;
   inspecting, at the network device, a header of the SIP or H.323 signaling packet to determine if a tag exists, within the signaling packet header, that indicates that the data traffic originated from an original source node or an original source network as Voice over Internet Protocol (VoIP) originated traffic, or to determine if the tag does not exist within the signaling packet header thereby indicating that the data traffic is non-VoIP originated traffic,
      wherein the tag includes additional data inserted into the signaling packet header for identifying the associated data traffic as VoIP originated traffic and for distinguishing the associated data traffic from non-VoIP originated traffic, and
      wherein the VoIP originated traffic comprises data traffic that originated from the original source node or the original source network as VoIP traffic, and wherein the non-VoIP originated traffic comprises VoIP traffic that was converted to VoIP from Time Division Multiplexing (TDM) after being sent from the original source node or the original source network;
   causing the associated data traffic to be routed via a first network route if the tag exists, that indicates that the data traffic is VoIP originated traffic, within the signaling packet header; and
   causing the associated data traffic to be routed via a second network route if the tag does not exist within the signaling packet header, wherein the second network route is a different network route than the first network route.

2. The method of claim 1, wherein causing the associated data traffic to be routed via the first network route comprises one of:
   causing the associated data traffic to be routed via the first network route to a VoIP-based Long Distance (LD) carrier or to a Competitive Local Exchange Carrier (CLEC) that supports reduced VoIP rates or reduced taxation if the tag exists in the signaling packet header that indicates that the data traffic is VoIP originated traffic,
   causing the associated data traffic to be routed via the first network route to a specific carrier or a specific network if the tag exists in the signaling packet header that indicates that the data traffic is VoIP originated traffic, or
   causing the associated data traffic to be routed over a specific network connection or a specific network address if the tag exists in the signaling packet header that indicates that the data traffic is VoIP originated traffic.

3. The method of claim 1, wherein causing the associated data traffic to be routed via the second network route comprises one of:
   causing the associated data traffic to be routed via the second network route to a carrier that does not support reduced VoIP rates or reduced taxation if the tag does not exist within the header of the SIP or H.323 signaling packet, or
   causing the associated data traffic to be routed via the second network route to a Time Division Multiplexing (TDM) network if the tag does not exist within the header of the SIP or H.323 signaling packet.

4. The method of claim 1, wherein the tag additionally identifies a Time Domain Multiplexed (TDM) originating jurisdiction from which a roaming mobile device originated the data traffic.

5. The method of claim 1, wherein the tag comprises a tag defined in accordance with Internet Engineering Task Force (IETF) Request for Comments (RFC) 4694.

6. The method of claim 1, wherein the tag comprises one of:
   a) a "rn-context" tag defined in accordance with Internet Engineering Task Force (IETF) Request for Comments (RFC) 4694 and the additional data comprises a code inserted into the "rn-context" tag to identify the associated data traffic as VoIP originated traffic;
   b) a "rn" tag defined in accordance with IETF RFC 4694 and the additional data comprises a code, appended to jurisdiction information in the "rn" tag, that identifies the associated data traffic as VoIP originated traffic; or
   c) a "rn" tag defined in accordance with IETF RFC 4694 and the additional data comprises a code inserted into the "rn" tag to identify the associated data traffic as VoIP originated traffic.

7. A method, comprising:
   receiving, at a network device, a Session Initiation Protocol (SIP) or H.323 signaling packet associated with data traffic, wherein the data traffic is associated with a VoIP call;
   inspecting, at the network device, a header of the SIP or H.323 signaling packet to determine if a tag exists, within the signaling packet header, that indicates that the data traffic comprises Voice over Internet Protocol (VoIP) originated traffic, or to determine if the tag does not exist within the signaling packet header thereby indicating that the data traffic is non-VoIP originated traffic, wherein the tag includes additional data inserted into the signaling packet header for identifying the associated data traffic as VoIP originated traffic and for distinguishing the associated data traffic from non-VoIP originated traffic, and wherein the VoIP originated traffic comprises data traffic that originated from an original source node or an original source network as VoIP traffic and wherein the non-VoIP originated traffic comprises VoIP traffic that was converted to VoIP from Time Division Multiplexing (TDM) after being sent from the original source node or the original source network;

causing the VoIP call to be subjected to first settlement or taxation burdens if the tag exists, that indicates that the data traffic comprises VoIP originated traffic, within the signaling packet header; and causing the VoIP call to be subject to second settlement or taxation burdens if the tag does not exist within the signaling packet header, wherein the second settlement or taxation burdens are different than the first settlement or taxation burdens.

8. The method of claim 7, wherein the first settlement or taxation burdens comprise reduced settlement or taxation burdens relative to the second settlement or taxation burdens.

9. The method of claim 7, wherein the tag additionally identifies a Time Domain Multiplexed (TDM) originating jurisdiction from which a roaming mobile device originated the data traffic.

10. The method of claim 7, wherein the tag comprises a tag defined in accordance with Internet Engineering Task Force (IETF) Request for Comments (RFC) 4694.

11. The method of claim 7, wherein the tag comprises one of:
a) a "rn-context" tag defined in accordance with Internet Engineering Task Force (IETF) Request for Comments (RFC) 4694 and the additional data comprises a code inserted into the "rn-context" tag to identify the associated data traffic as VoIP originated traffic;
b) a "rn" tag defined in accordance with IETF RFC 4694 and the additional data comprises a code, appended to jurisdiction information in the "rn" tag, that identifies the associated data traffic as VoIP originated traffic; or
c) a "rn" tag defined in accordance with IETF RFC 4694 and the additional data comprises a code inserted into the "rn" tag to identify the associated data traffic as VoIP originated traffic.

12. A network node, comprising:
a communication interface; and
a processing unit configured to:
receive, via the communication interface, a Session Initiation Protocol (SIP) or H.323 signaling packet associated with data traffic,
inspect a header of the SIP or H.323 signaling packet to determine if a tag exists, within the header, that indicates that the data traffic originated from an original source node or an original source network as Voice over Internet Protocol (VoIP) originated traffic or to determine if the tag does not exist in the signaling packet header thereby indicating that the data traffic is non-VoIP originated traffic,
wherein the tag includes additional data inserted into the signaling packet header for identifying the associated data traffic as VoIP originated traffic and for distinguishing the associated data traffic from non-VoIP originated traffic, and
wherein the VoIP originated traffic comprises data traffic that originated from the original source node or the original source network as VoIP traffic, and wherein the non-VoIP originated traffic comprises VoIP traffic that was converted to VoIP from Time Division Multiplexing (TDM) after being sent from the original source node or the original source network,
cause the associated data traffic to be routed via a first network route if the tag exists, in the signaling packet header, that indicates that the data traffic is VoIP originated traffic, and
cause the associated data traffic to be routed via a second network route if the tag does not exist within the signaling packet header, wherein the second network route is a different network route than the first network route.

13. The network node of claim 12, wherein, when causing the associated data traffic to be routed via the first network route, the processing unit is further configured to perform one of:
cause the associated data traffic to be routed via the first network route to a VoIP-based Long Distance (LD) carrier or to a Competitive Local Exchange Carrier (CLEC) that supports reduced VoIP rates or reduced taxation if the tag exists in the signaling packet header that indicates that the data traffic is VoIP originated traffic,
cause the associated data traffic to be routed via the first network route to a specific carrier or a specific network if the tag exists in the signaling packet header that indicates that the data traffic is VoIP originated traffic, or
cause the associated data traffic to be routed over a specific network connection or a specific network address if the tag exists in the signaling packet header that indicates that the data traffic is VoIP originated traffic.

14. The network node of claim 12, wherein, when causing the associated data traffic to be routed via the second network route, the processing unit is further configured to perform one of:
cause the associated data traffic to be routed via the second network route to a carrier that does not support reduced VoIP rates or reduced taxation if the tag does not exist within the signaling packet header, or
cause the associated data traffic to be routed via the second network route to a Time Division Multiplexing (TDM) network if the tag does not exist within the signaling packet header.

15. The network node of claim 12, wherein the tag additionally identifies a Time Domain Multiplexed (TDM) originating jurisdiction from which a roaming mobile device originated the data traffic.

16. The network node of claim 12, wherein the tag comprises a tag defined in accordance with Internet Engineering Task Force (IETF) Request for Comments (RFC) 4694.

17. The network node of claim 12, wherein the tag comprises one of:
a) a "rn-context" tag defined in accordance with Internet Engineering Task Force (IETF) Request for Comments (RFC) 4694 and the additional data comprises a code inserted into the "rn-context" tag to identify the associated data traffic as VoIP originated traffic;
b) a "rn" tag defined in accordance with IETF RFC 4694 and the additional data comprises a code, appended to jurisdiction information in the "rn" tag, that identifies the associated data traffic as VoIP originated traffic; or c) a "rn" tag defined in accordance with IETF RFC 4694 and the additional data comprises a code inserted into the "rn" tag to identify the associated data traffic as VoIP originated traffic.

18. A network node, comprising:
a communication interface; and
a processing unit configured to:
  receive, via the communication interface, a Session Initiation Protocol (SIP) or H.323 signaling packet associated with data traffic, wherein the data traffic is associated with a VoIP call,
  inspect a header of the SIP or H.323 signaling packet to determine if a tag exists, within the signaling packet header, that indicates whether the data traffic comprises Voice over Internet Protocol (VoIP) originated traffic, or to determine if the tag does not exist within the signaling packet header thereby indicating that the data traffic is non-VoIP originated traffic,
    wherein the tag includes additional data inserted into the signaling packet header for identifying the associated data traffic as VoIP originated traffic and for distinguishing the associated data traffic from non-VoIP originated traffic, and
    wherein the VoIP originated traffic comprises data traffic that originated from an original source node or an original source network as VoIP traffic, and wherein the non-VoIP originated traffic comprises VoIP traffic that was converted to VoIP from Time Division Multiplexing (TDM) after being sent from the original source node or the original source network,
  cause the VoIP call to be subjected to first settlement or taxation burdens if the tag exists, that indicates that the data traffic comprises VoIP originated traffic, within the signaling packet header, and
  cause the VoIP call to be subject to second settlement or taxation burdens if the tag does not exist within the signaling packet header, wherein the second settlement or taxation burdens are different than the first settlement or taxation burdens.

19. The network node of claim 18, wherein the first settlement or taxation burdens comprise reduced settlement or taxation burdens relative to the second settlement or taxation burdens.

20. The network node of claim 18, wherein the processing unit is further configured:
  cause the associated data traffic to be routed via a first network route if the tag exists, that indicates that the data traffic is VoIP originated traffic, within the signaling packet header, and
  cause the associated data traffic to be routed via a second network route if the tag does not exist within the signaling packet header, wherein the second network route is a different network route than the first network route.

21. The network node of claim 20, wherein, when causing the associated data traffic to be routed via the first network route, the processing unit is further configured to perform one of:
  cause the associated data traffic to be routed via the first network route to a VoIP-based Long Distance (LD) carrier or to a Competitive Local Exchange Carrier (CLEC) that supports reduced VoIP rates or reduced taxation if the tag exists, that indicates that the data traffic is VoIP originated traffic, within the signaling packet header,
  cause the associated data traffic to be routed via the first network route to a specific carrier or a specific network if the tag exists within the signaling packet header that indicates that the data traffic is VoIP originated traffic, or
  cause the associated data traffic to be routed over a specific network connection or a specific network address if the tag exists within the signaling packet header that indicates that the data traffic is VoIP originated traffic.

22. The network node of claim 20, wherein, when causing the associated data traffic to be routed via the second network route, the processing unit is further configured to perform one of:
  cause the associated data traffic to be routed via the second network route to a carrier that does not support reduced VoIP rates or reduced taxation if the tag does not exist within the signaling packet header, or
  cause the associated data traffic to be routed via the second network route to a Time Division Multiplexing (TDM) network if the tag does not exist within the signaling packet header.

23. The network node of claim 18, wherein the tag additionally identifies a Time Domain Multiplexed (TDM) originating jurisdiction from which a roaming mobile device originated the data traffic.

24. The network node of claim 18, wherein the tag comprises a tag defined in accordance with Internet Engineering Task Force (IETF) Request for Comments (RFC) 4694.

25. The network node of claim 18, wherein the tag comprises one of:
  a) a "rn-context" tag defined in accordance with Internet Engineering Task Force (IETF) Request for Comments (RFC) 4694 and the additional data comprises a code inserted into the "rn-context" tag to identify the associated data traffic as VoIP originated traffic;
  b) a "rn" tag defined in accordance with IETF RFC 4694 and the additional data comprises a code, appended to jurisdiction information in the "rn" tag, that identifies the associated data traffic as VoIP originated traffic; or
  c) a "rn" tag defined in accordance with IETF RFC 4694 and the additional data comprises a code inserted into the "rn" tag to identify the associated data traffic as VoIP originated traffic.

\* \* \* \* \*